US012618545B1

(12) United States Patent
Huang et al.

(10) Patent No.: US 12,618,545 B1
(45) Date of Patent: May 5, 2026

(54) LIGHTING DEVICE

(71) Applicant: ASUSTeK COMPUTER INC., Taipei City (TW)

(72) Inventors: Chien-Yi Huang, Taipei City (TW); Chao-Shun Wang, Taipei City (TW); Ching-Chen Wei, Taipei City (TW); Shih-Ting Wu, Taipei City (TW)

(73) Assignee: ASUSTeK COMPUTER INC., Taipei City (TW)

(*) Notice: Subject to any disclaimer, the term of this patent is extended or adjusted under 35 U.S.C. 154(b) by 0 days.

(21) Appl. No.: 19/060,800

(22) Filed: Feb. 24, 2025

(30) Foreign Application Priority Data

Jan. 3, 2025    (TW) .................................. 114100204

(51) Int. Cl.
| | |
|---|---|
| *F21V 17/02* | (2006.01) |
| *F21V 7/00* | (2006.01) |
| *F21V 7/16* | (2006.01) |
| *F21V 14/04* | (2006.01) |
| *F21Y 103/10* | (2016.01) |
| *G06F 1/16* | (2006.01) |

(52) U.S. Cl.
CPC .............. *F21V 17/02* (2013.01); *F21V 7/005* (2013.01); *F21V 7/16* (2013.01); *F21V 14/04* (2013.01); *G06F 1/1607* (2013.01); *F21Y 2103/10* (2016.08)

(58) Field of Classification Search
CPC ........ F21V 14/04; F21V 14/045; F21V 7/005; F21V 7/16; F21V 7/18; F21S 41/67; F21S 41/675
See application file for complete search history.

(56) References Cited

U.S. PATENT DOCUMENTS

| | | | | |
|---|---|---|---|---|
| 4,855,884 | A | * | 8/1989 | Richardson ............... F21V 7/16 |
| | | | | 362/346 |
| 9,234,645 | B2 | * | 1/2016 | Min .......................... F21V 7/00 |
| 12,146,639 | B1 | * | 11/2024 | Cai .......................... F21V 17/04 |

FOREIGN PATENT DOCUMENTS

| | | |
|---|---|---|
| CN | 110736077 | 1/2020 |
| CN | 112113166 | 12/2020 |

(Continued)

OTHER PUBLICATIONS

Machine translation of Zhang, CN-114165749-A, published Mar. 11, 2022 (Year: 2022).*

*Primary Examiner* — William N Harris
(74) *Attorney, Agent, or Firm* — JCIPRNET

(57) ABSTRACT

A lighting device includes a housing, an elastic reflective element, a light-emitting unit, and a switching module. The elastic reflective element has a resisting surface and a reflective surface opposite to each other. The light-emitting unit is configured to provide an illumination beam to the reflective surface. The switching module is configured in the housing. When the switching module has not pressed against the resisting surface, or when the switching module has pressed against the resisting surface but has not yet transformed the shape of the reflective surface, the reflective surface assumes a first state, and the illumination beam reflected by the reflective surface has a first light pattern. When the switching module presses against the resisting surface and transforms the shape of the reflective surface, the reflective surface assumes a second state, and the illumination beam reflected by the reflective surface has a second light pattern.

10 Claims, 14 Drawing Sheets

(56)                     References Cited

FOREIGN PATENT DOCUMENTS

| | | | | | |
|---|---|---|---|---|---|
| CN | 114165749 | A | * | 3/2022 | .............. F21V 29/67 |
| CN | 114607965 | | | 6/2022 | |
| TW | 202219425 | | | 5/2022 | |

* cited by examiner

140A

140A

140B

140B

140C

140C

140D

140D

LIGHTING DEVICE

CROSS-REFERENCE TO RELATED APPLICATION

This application claims the priority benefit of Taiwan application serial no. 114100204, filed on Jan. 3, 2025. The entirety of the above-mentioned patent application is hereby incorporated by reference herein and made a part of this specification.

BACKGROUND

Technical Field

The disclosure relates to an optical device, and particularly relates to a lighting device.

Description of Related Art

The screen hanging lamp is a lighting device specially designed for computer displays. It uses asymmetric light technology to evenly project light on the desktop without disturbing the screen, which may effectively reduce eye fatigue. It usually has brightness and color temperature adjustment functions to adapt to different ambient light requirements. Compared with traditional desk lamps, screen hanging lamps do not occupy desktop space and are suitable for small workspaces and long-term computer users, especially in night environments.

However, the reflective lens in the current screen hanging lamp is fixed, so the distance from the irradiation surface may not be adjusted according to the user, and the focus may not be changed to adjust the irradiation energy.

SUMMARY

The disclosure provides a lighting device that may achieve the effect of adjusting different light patterns through a simple switching module mechanism.

The disclosure provides a lighting device, including a housing, an elastic reflective element, alight-emitting unit, and a switching module. The housing is a hollow tubular structure. The elastic reflective element is configured in the housing. The elastic reflective element has a resisting surface and a reflective surface opposite to each other. The light-emitting unit is configured on the elastic reflective element to provide an illumination beam to the reflective surface. The switching module is configured in the housing and adapted to press against the resisting surface to transform the shape of the reflective surface. When the switching module has not pressed against the resisting surface, or when the switching module has pressed against the resisting surface but has not yet transformed the shape of the reflective surface, the reflective surface assumes a first state, and the illumination beam reflected by the reflective surface has a first light pattern. When the switching module presses against the resisting surface and transforms the shape of the reflective surface, the reflective surface assumes a second state, and the illumination beam reflected by the reflective surface has a second light pattern.

Based on the above, in the lighting device of the disclosure, the lighting device includes the housing, the elastic reflective element, the light-emitting unit, and the switching module. The elastic reflective element has the resisting surface and the reflective surface opposite to each other, and the switching module is configured to press against the resisting surface to transform the shape of the reflective surface. When the switching module has not pressed against the resisting surface, or when the switching module has pressed against the resisting surface but has not yet transformed the shape of the reflective surface, the reflective surface assumes the first state, and the illumination beam reflected by the reflective surface has the first light pattern. When the switching module presses against the resisting surface and transforms the shape of the reflective surface, the reflective surface assumes the second state, and the illumination beam reflected by the reflective surface has the second light pattern. In this way, the surface shape of the reflective surface in the elastic reflective element may be adjusted through a simple switching module mechanism, and then the light pattern emitted by the lighting device may be switched to achieve optimized irradiation effects in different situations.

DESCRIPTION OF THE EMBODIMENTS

Figure 1:
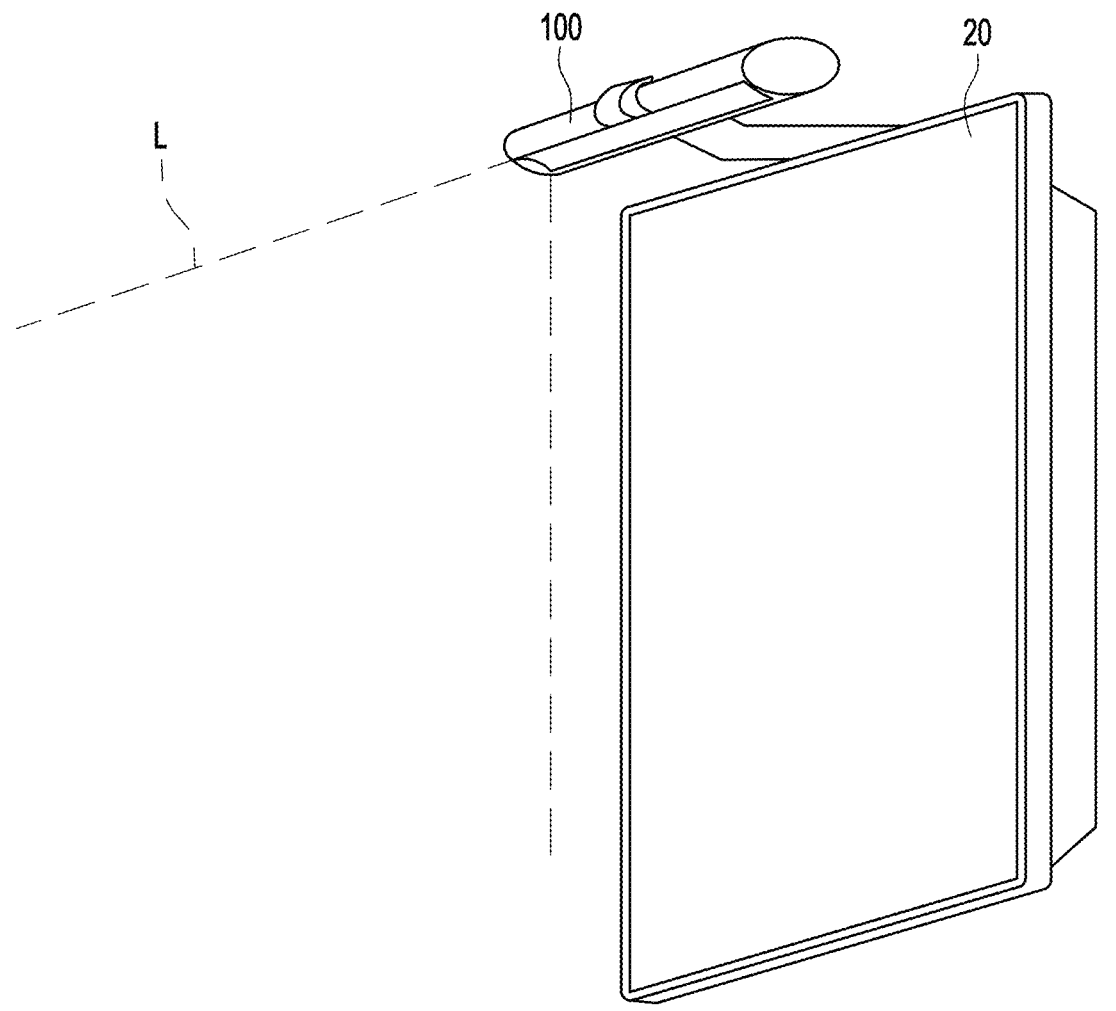
FIG. 1 is a schematic view of a lighting device collocated with a display device according to an embodiment of the disclosure.

FIG. 1 is a schematic view of a lighting device collocated with a display device according to an embodiment of the disclosure. In the embodiment, a lighting device 100, such as a screen hanging lamp, is provided, which is detachably configured to be externally mounted on the housing of a display device 20 to provide an illumination beam L, so as to enable users to obtain sufficient light sources, thereby improving work efficiency or experience effects.

Figure 2:
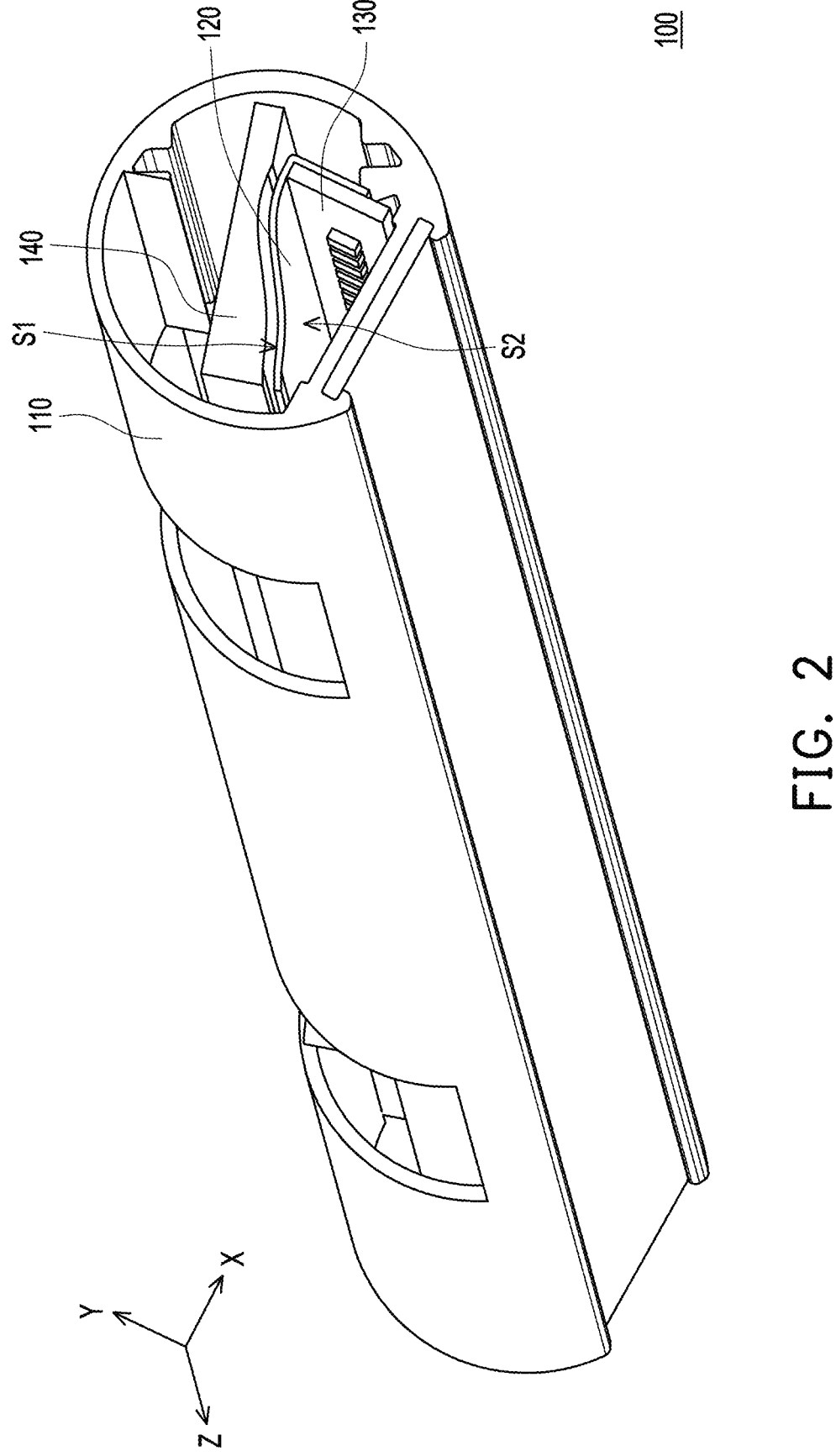
FIG. 2 is a schematic three-dimensional view of a lighting device according to an embodiment of the disclosure.
Figure 3A:
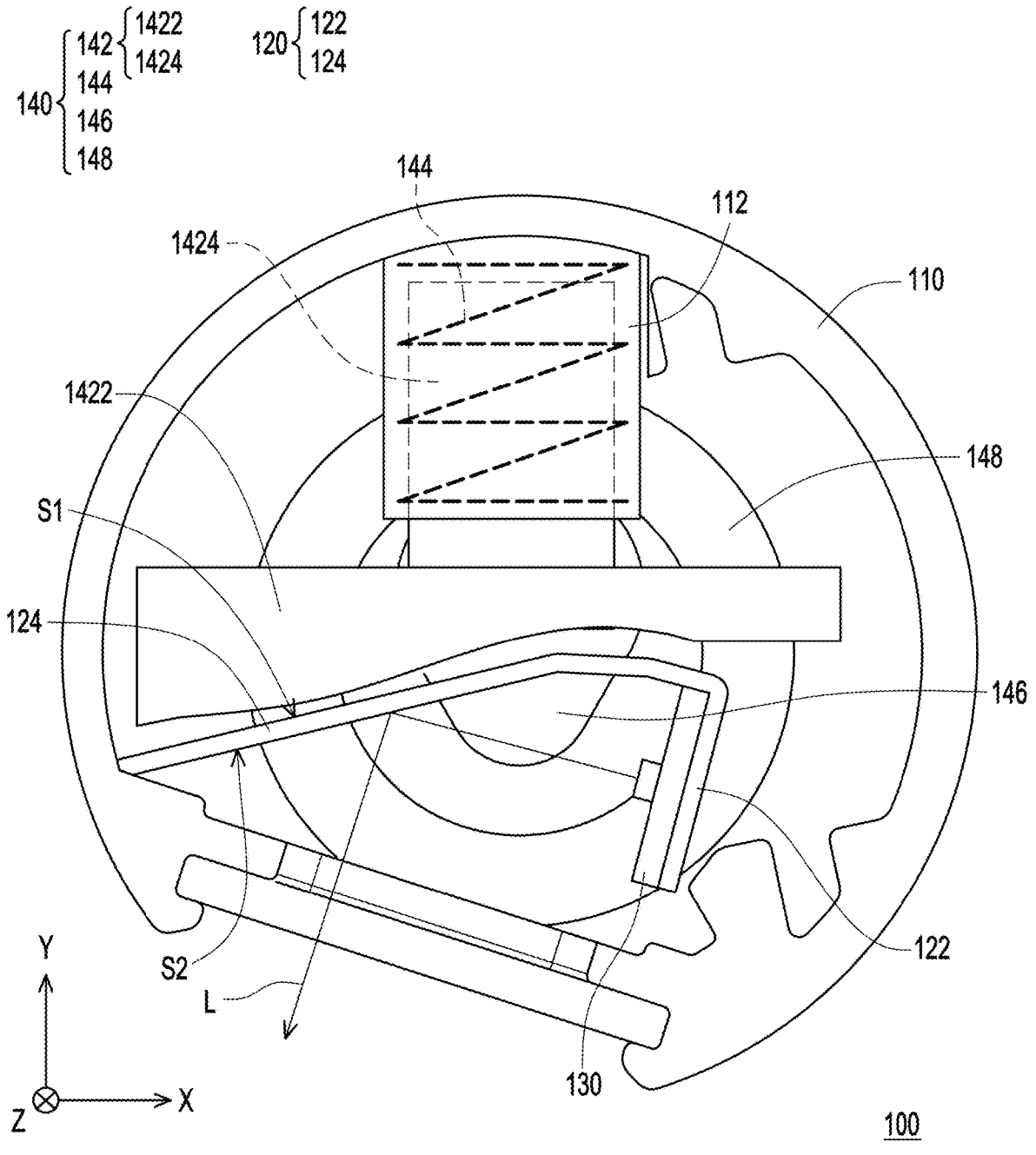
FIG. 3A and FIG. 3B are schematic side views of the lighting device depicted in FIG. 2 showing different orientations of a reflective surface in a first state.
Figure 3B:
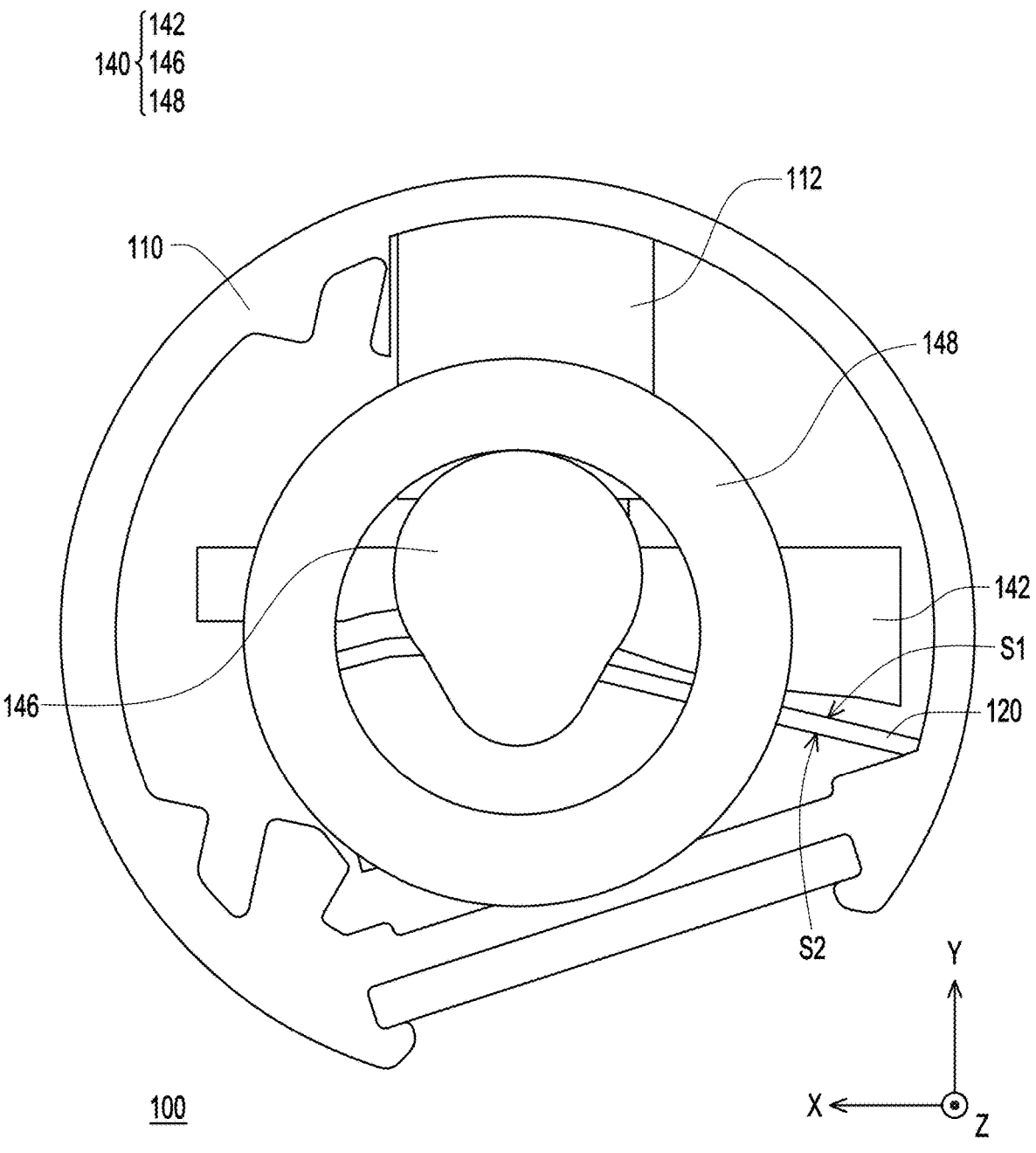

FIG. 2 is a schematic three-dimensional view of a lighting device according to an embodiment of the disclosure. FIG. 3A and FIG. 3B are schematic side views of the lighting device depicted in FIG. 2 showing different orientations of a reflective surface in a first state. Referring to FIG. 2 to FIG.

3B, the lighting device 100 includes a housing 110, an elastic reflective element 120, a light-emitting unit 130, and a switching module 140. The housing 110 is a hollow tubular structure, such as a cylindrical outer housing structure with a hollow inner side.

The elastic reflective element 120 is configured in the housing 110. The elastic reflective element 120 has a resisting surface S1 and a reflective surface S2 opposite to each other. In the embodiment, the material of the elastic reflective element 120 includes, for example, a polymer material with deformable characteristics, and the reflective surface S2 is, for example, plated with mirror silver. In a preferred embodiment, the reflectivity of the reflective surface S2 to visible light may reach 95%. In the embodiment, the elastic reflective element 120 includes a fixed part 122 and a deformation part 124 connected to each other. The angle between the fixed part 122 and the deformation part 124 is an acute angle, but the disclosure is not limited thereto.

The light-emitting unit 130 is configured on the elastic reflective element 120. The light-emitting unit 130 is, for example, a white light-emitting diode light bar, and is configured to provide the illumination beam L to the reflective surface S2 of the elastic reflective element 120. In the embodiment, the light-emitting unit 130 is connected to the fixed part 122 of the elastic reflective element 120.

The switching module 140 is configured in the housing 110 and adapted to press against the resisting surface S1 of the elastic reflective element 120 to transform the shape of the reflective surface S2. In the embodiment, the switching module 140 is configured to press against the deformation part 124 of the elastic reflective element 120. For example, in the embodiment, the switching module 140 is, for example, a cam mechanism, including a molded part 142 for pressing against the elastic reflective element 120. The molded part 142 is configured to contact the resisting surface S1 of the elastic reflective element 120. It is worth mentioning that the switching module 140 may be designed as a reciprocating motion mechanism, thereby simplifying the user's operation method and improving switching convenience. The detailed implementation of the switching module 140 of the embodiment will be described in subsequent paragraphs.

Figure 4A:
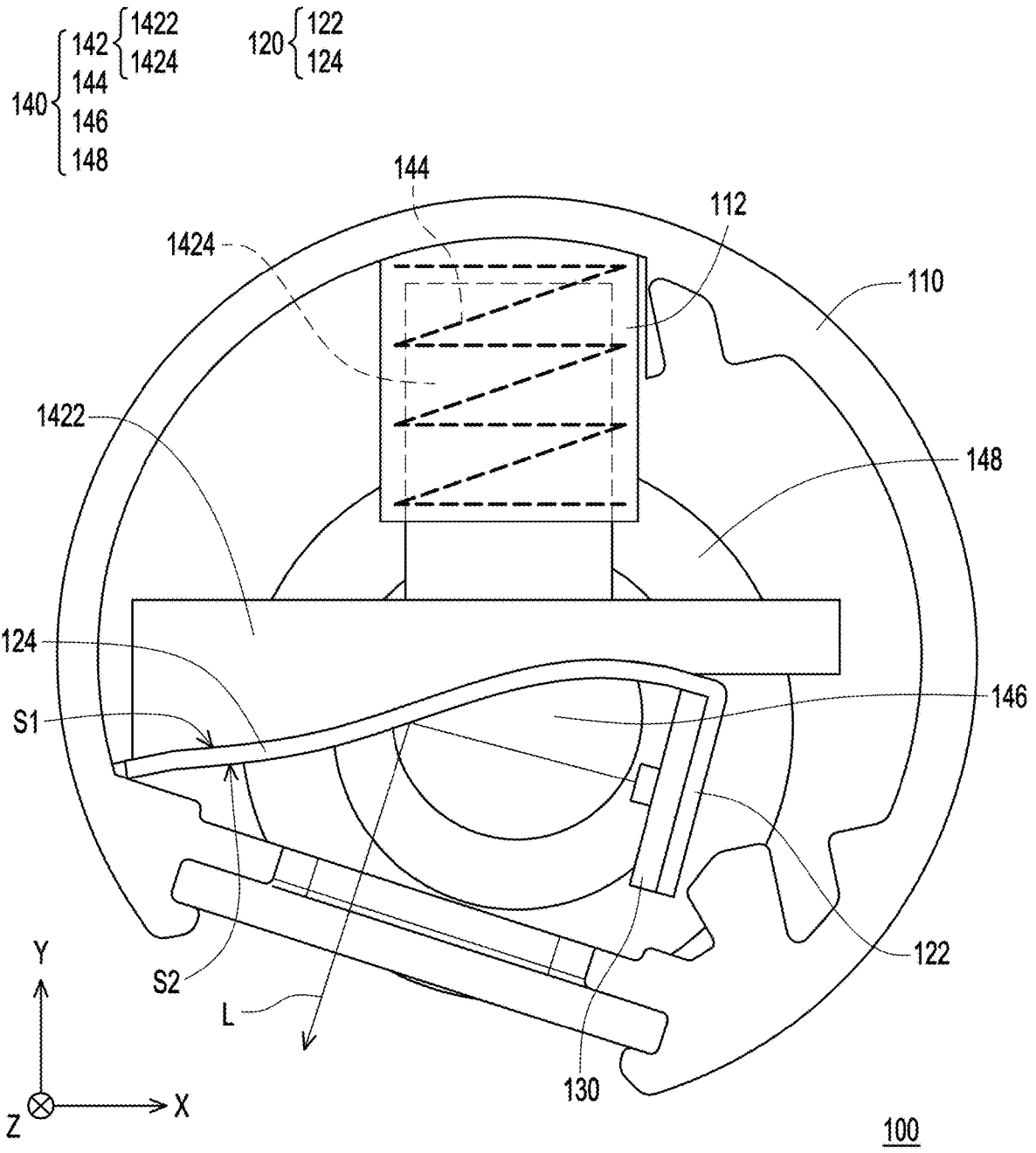
FIG. 4A and FIG. 4B are schematic side views of the lighting device depicted in FIG. 2 showing different orientations of a reflective surface in a second state.
Figure 4B:
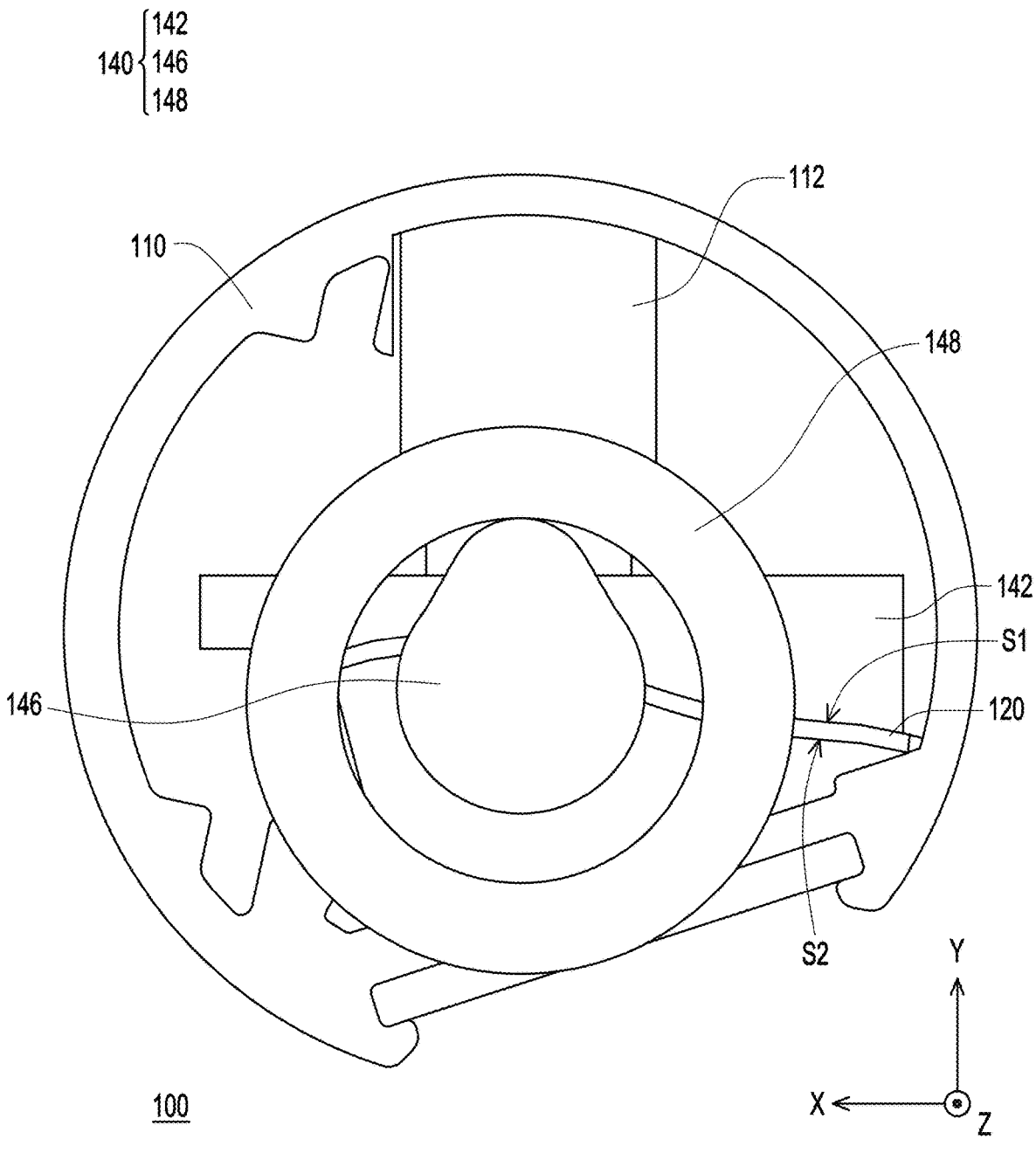
Figure 5A:
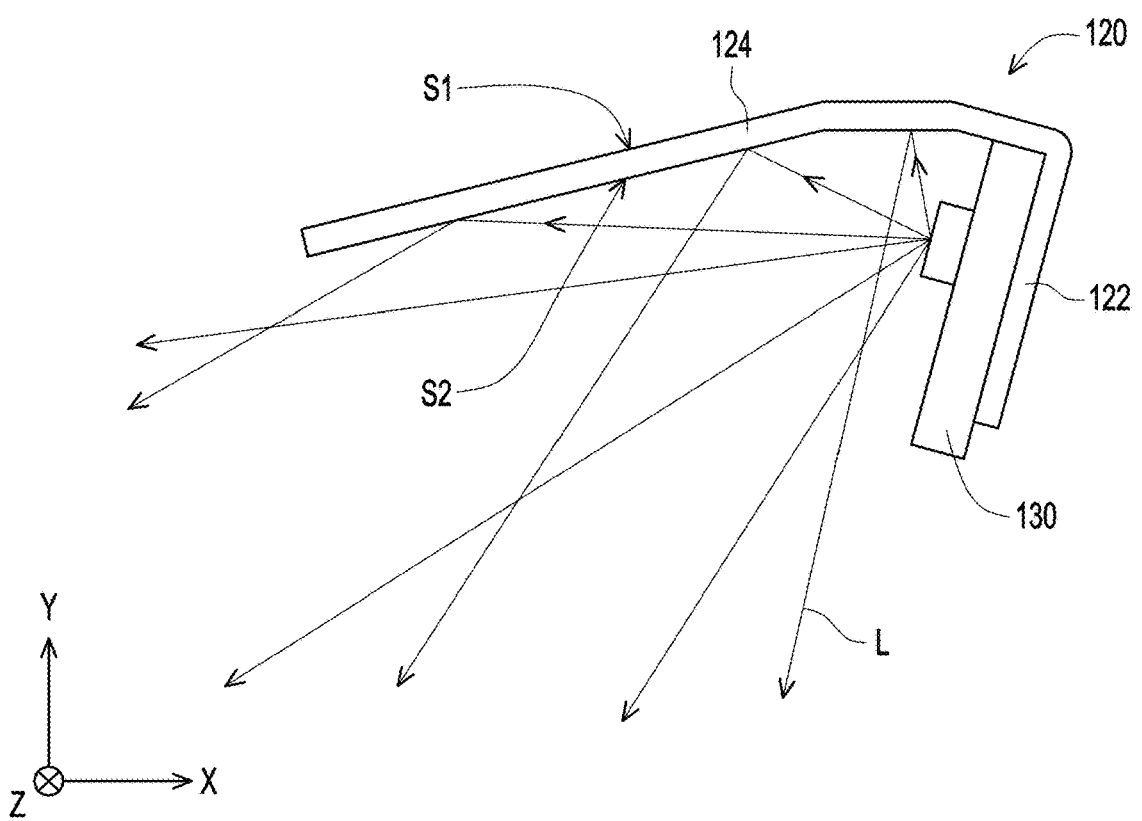
FIG. 5A and FIG. 5B are schematic views of light paths in the lighting device depicted in FIG. 2 showing a reflective surface in a first state and a second state.
Figure 5B:
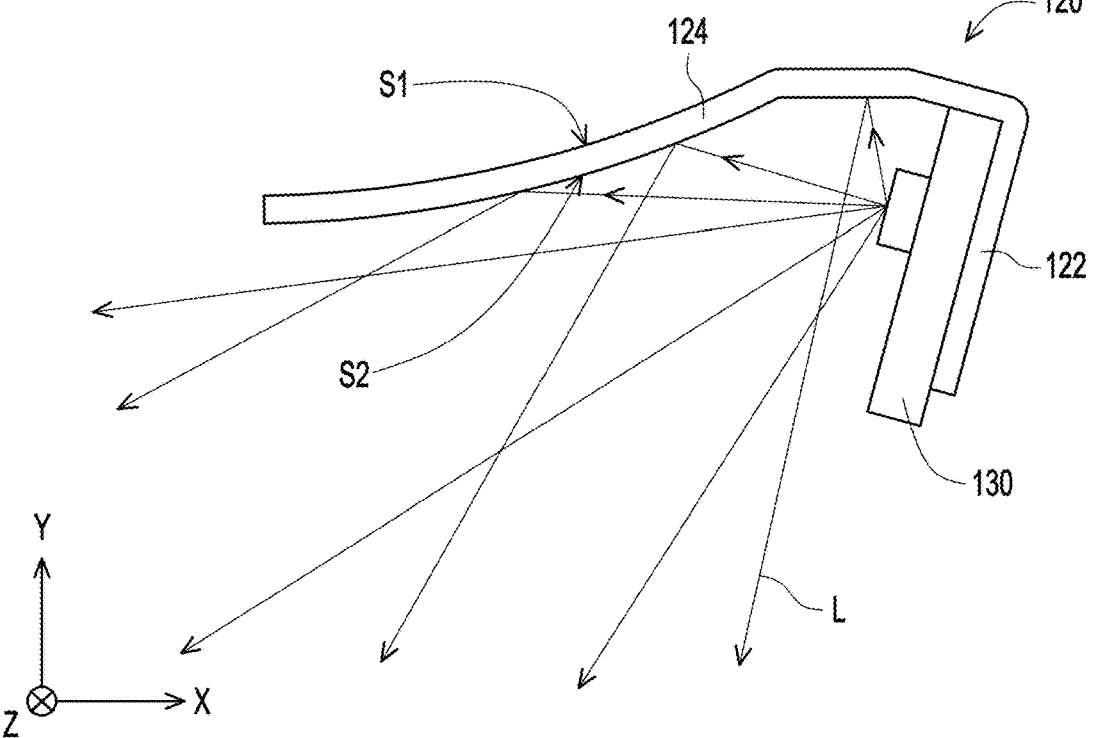

FIG. 4A and FIG. 4B are schematic side views of the lighting device depicted in FIG. 2 showing different orientations of a reflective surface in a second state. FIG. 5A and FIG. 5B are schematic views of light paths in the lighting device depicted in FIG. 2 showing a reflective surface in a first state and a second state. Referring to FIG. 3A, FIG. 4A, FIG. 5A, and FIG. 5B first, when the switching module 140 has not pressed against the resisting surface S1 of the elastic reflective element 120 or when the switching module 140 has pressed against the resisting surface S1 but has not yet transformed the shape of the reflective surface S2, the reflective surface S2 assumes the first state, and the illumination beam L reflected by the reflective surface S2 has a first light pattern, as shown in FIG. 3A and FIG. 5A. When the switching module 140 presses against the resisting surface S1 of the elastic reflective element 120 and transforms the shape of the reflective surface S2, the reflective surface S2 assumes the second state, and the illumination beam L reflected by the reflective surface S2 has a second light pattern, as shown in FIG. 4A and FIG. 5B. In this way, the lighting device 100 provided in the embodiment may adjust the surface shape of the reflective surface S2 in the elastic reflective element 120 through a simple switching module 140 mechanism, and then switch the light pattern emitted by the lighting device 100 to achieve optimized irradiation effects in different situations.

Figure 6:
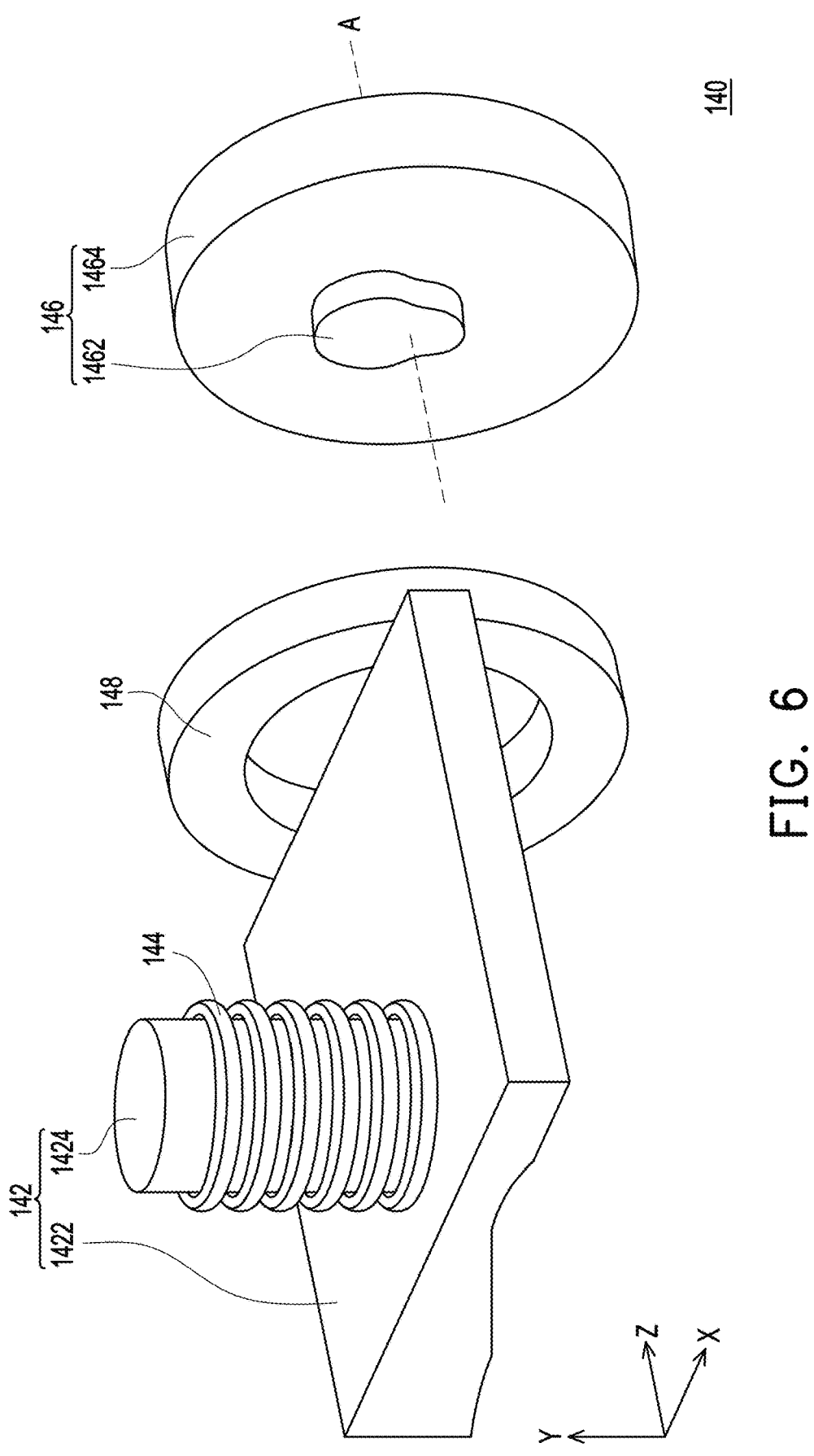
FIG. 6 is a schematic perspective view of a switching module of the lighting device depicted in FIG. 2.
Figure 7A:
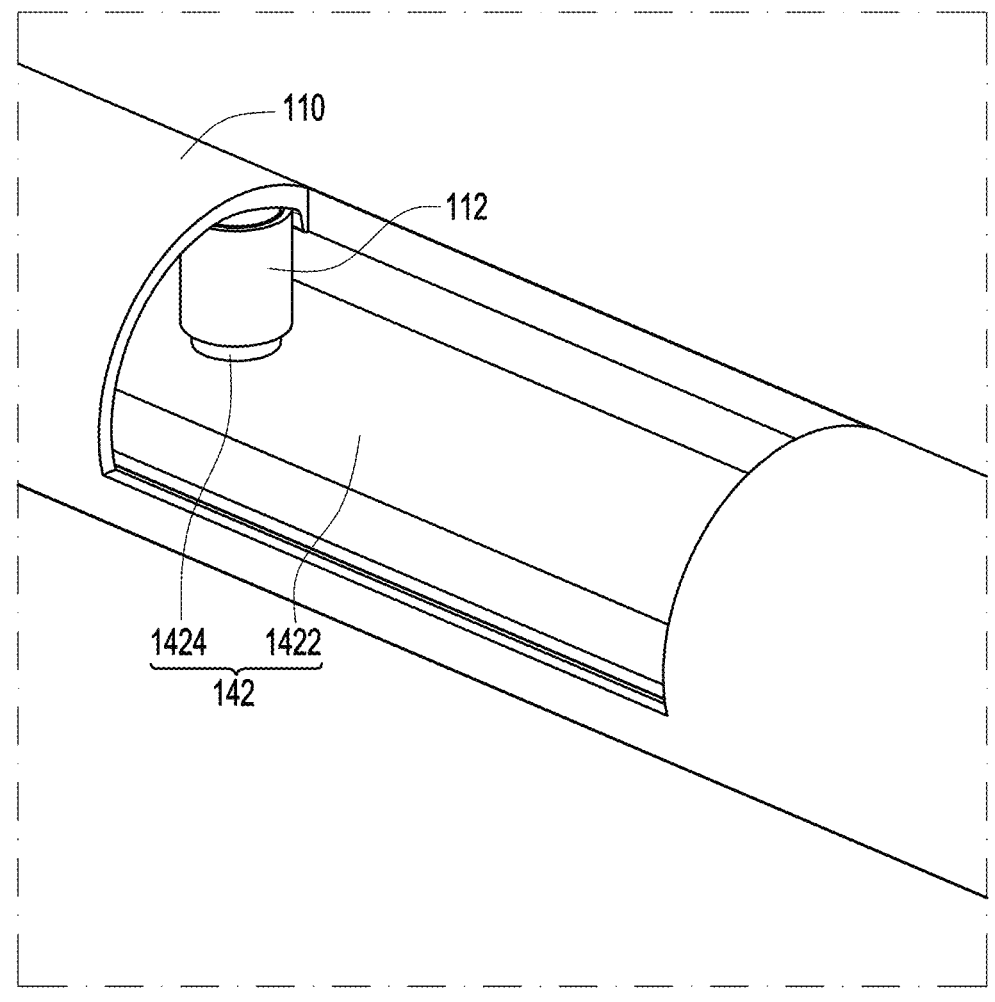
FIG. 7A and FIG. 7B are partial schematic perspective views of the lighting device depicted in FIG. 2 showing a reflective surface in a first state and a second state.
Figure 7B:
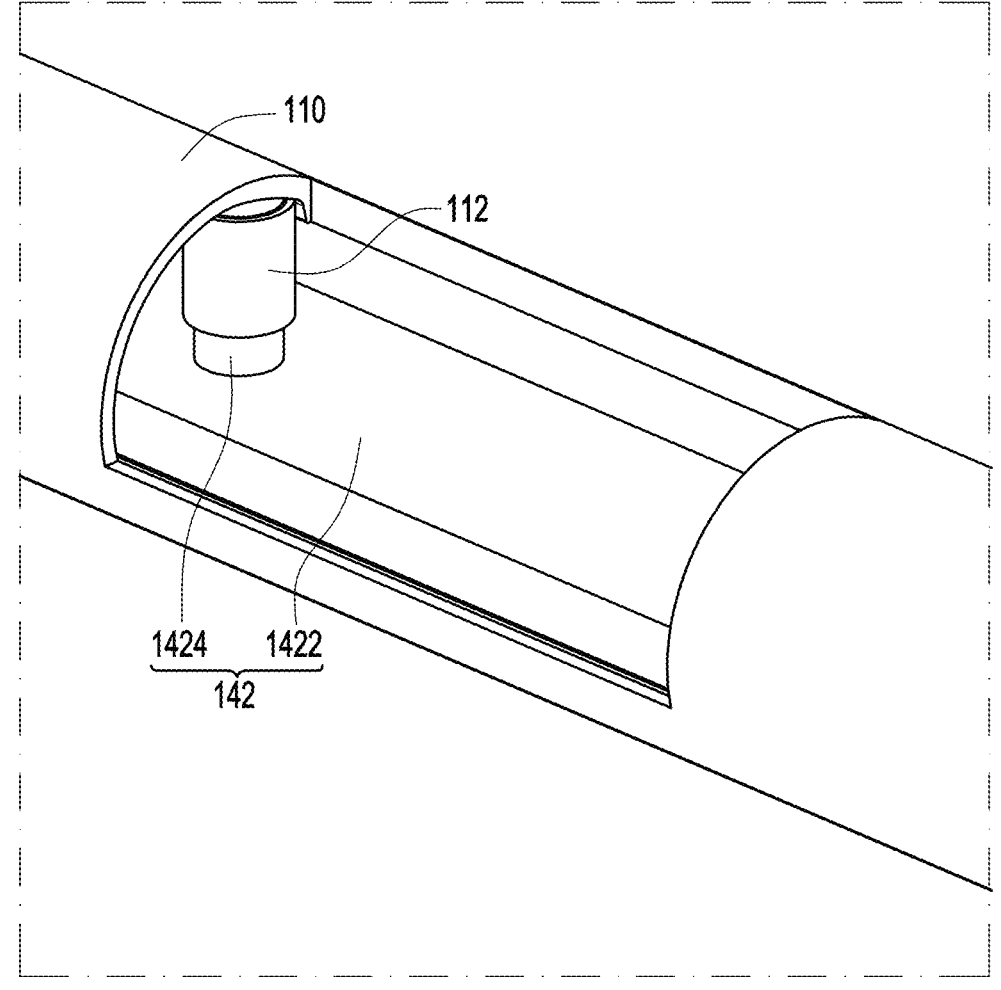

FIG. 6 is a schematic perspective view of a switching module of the lighting device depicted in FIG. 2. FIG. 7A and FIG. 7B are partial schematic perspective views of the lighting device depicted in FIG. 2 showing a reflective surface in a first state and a second state. Referring to FIG. 3A to FIG. 4B and FIG. 6 to FIG. 7B, specifically, in the embodiment, the molded part 142 includes a body 1422 and a guide rod part 1424 that are connected to each other. The switching module 140 also includes an elastic element 144, such as a spring, which is sleeved on the guide rod part 1424. In addition, the housing 110 of the lighting device 100 includes a conduit structure 112, and the guide rod part 1424 of the molded part 142 and the elastic element 144 of the switching module 140 are disposed within the conduit structure 112 of the housing 110. Therefore, when the switching module 140 performs switching, the molded part 142 will only move along the extending direction of the conduit structure 112, as shown in FIG. 7A and FIG. 7B respectively.

On the other hand, in terms of switching mode, the switching module 140 also includes a cam structure 146 and a relay element 148. The relay element 148 is fixed to the molded part 142, and the cam structure 146 leans against the relay element 148 for rotating along a rotation axis A to push the relay element 148. When the cam structure 146 rotates to the first position, the relay element 148 drives the molded part 142 so that there is still a gap between the molded part 142 and the elastic reflective element 120. When the cam structure 146 rotates to the second position, the relay element 148 drives the molded part 142 so that the molded part 142 presses against the elastic reflective element 120 and transforms the shape of the reflective surface S2. More specifically, the relay element 148 is an annular structure, and the cam structure 146 includes a cam part 1462 and a rotating part 1464. The cam part 1462 leans against the inner-side surface of the relay element 148. The outer diameter dimension of the rotating part 1464 may be designed to be substantially the same as the outer diameter dimension of the housing 110 to maintain consistency in appearance. Therefore, when the user rotates the rotating part 1464, the rotating part 1464 drives the cam part 1462 to rotate, so that the asymmetric structure of the cam part 1462 pushes the relay element 148 to reciprocate in a linear manner. In this way, the effect of switching the light pattern of the illumination beam L may be achieved through a simple rotation, and then the light pattern emitted by the lighting device 100 may be switched to optimize the irradiation effect in different situations.

Figure 8A:
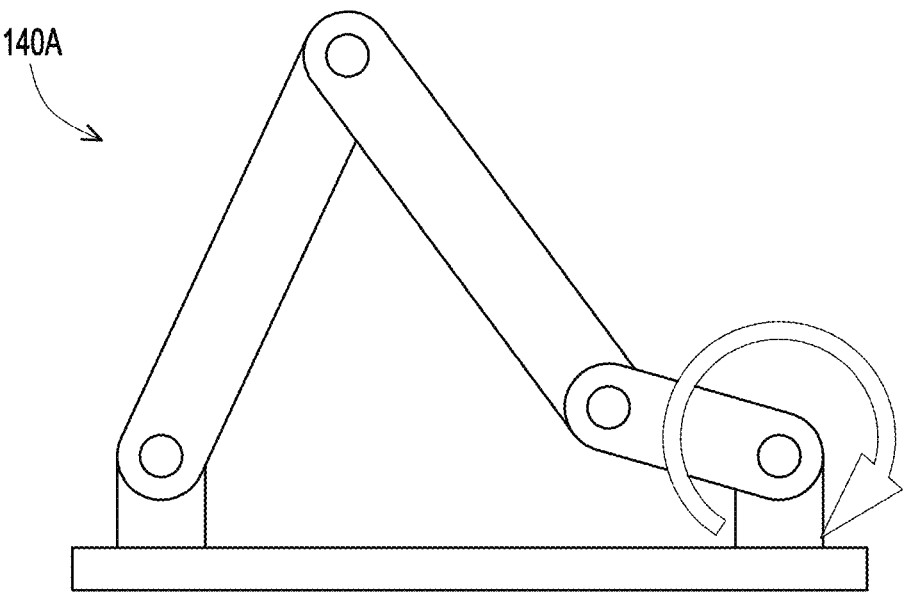
FIG. 8A and FIG. 8B are schematic views of a switching module in different states according to another embodiment of the disclosure.
Figure 8B:
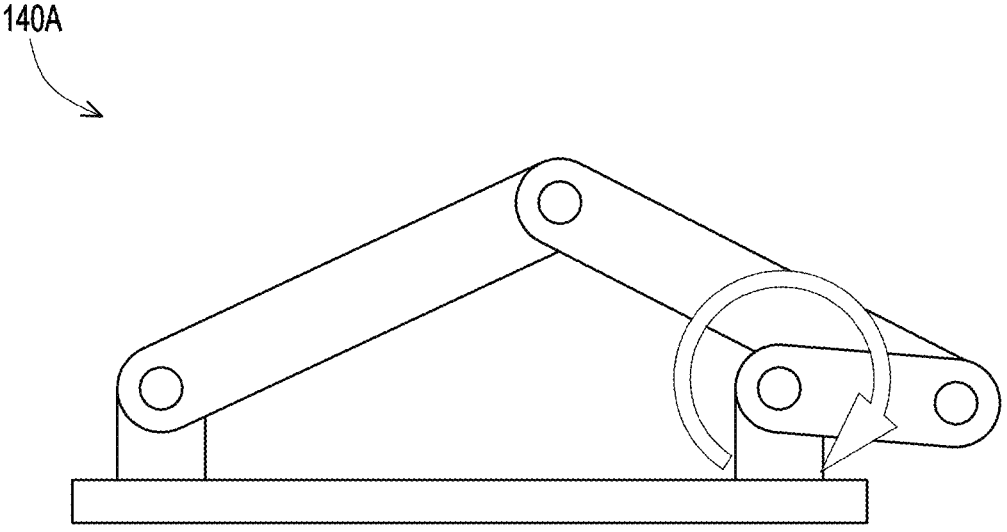

FIG. 8A and FIG. 8B are schematic views of a switching module in different states according to another embodiment. Referring to FIG. 8A and FIG. 8B, in the embodiment, a switching module 140A is, for example, a crank link mechanism, which may be configured to connect a molded part (not shown) to one of the fulcrums to perform a curved or linear reciprocating motion through rotation. The disclosure is not limited thereto.

Figure 9A:
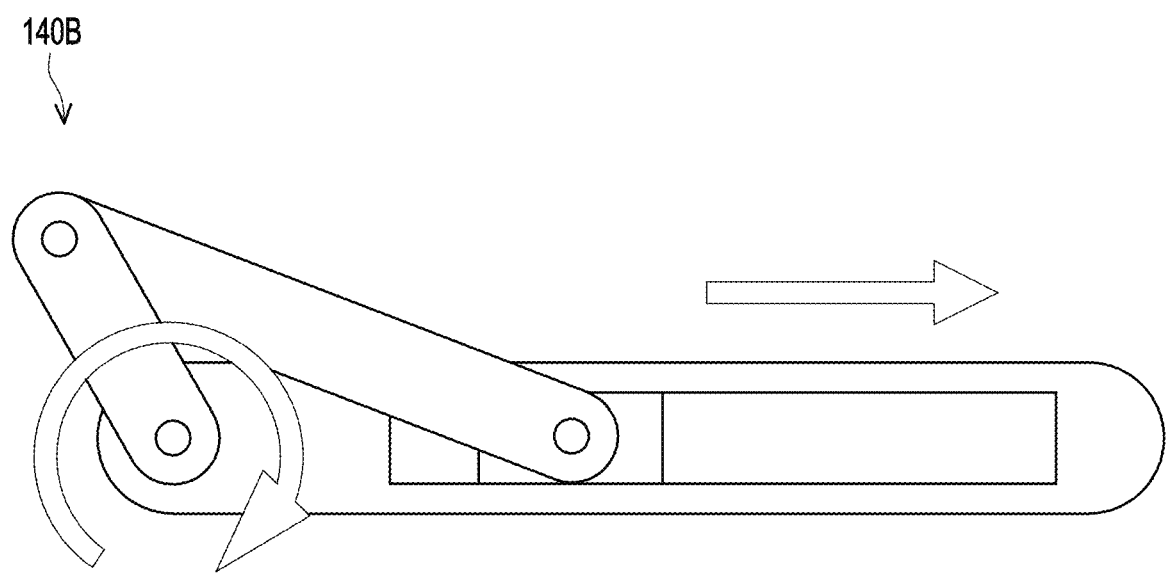
FIG. 9A and FIG. 9B are schematic views of a switching module in different states according to another embodiment of the disclosure.
Figure 9B:
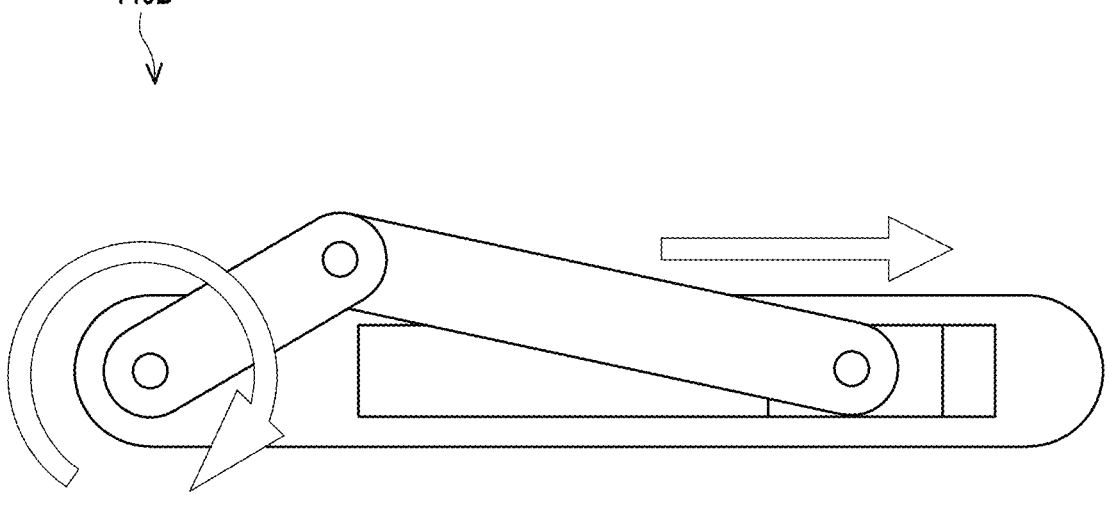

FIG. 9A and FIG. 9B are schematic views of a switching module in different states according to another embodiment. Referring to FIG. 9A and FIG. 9B, in the embodiment, a switching module 140B is, for example, a slider crank mechanism, which may be configured to connect the molded part (not shown) to one of the fulcrums to perform linear reciprocating motion through rotation. The disclosure is not limited thereto.

Figure 10A:
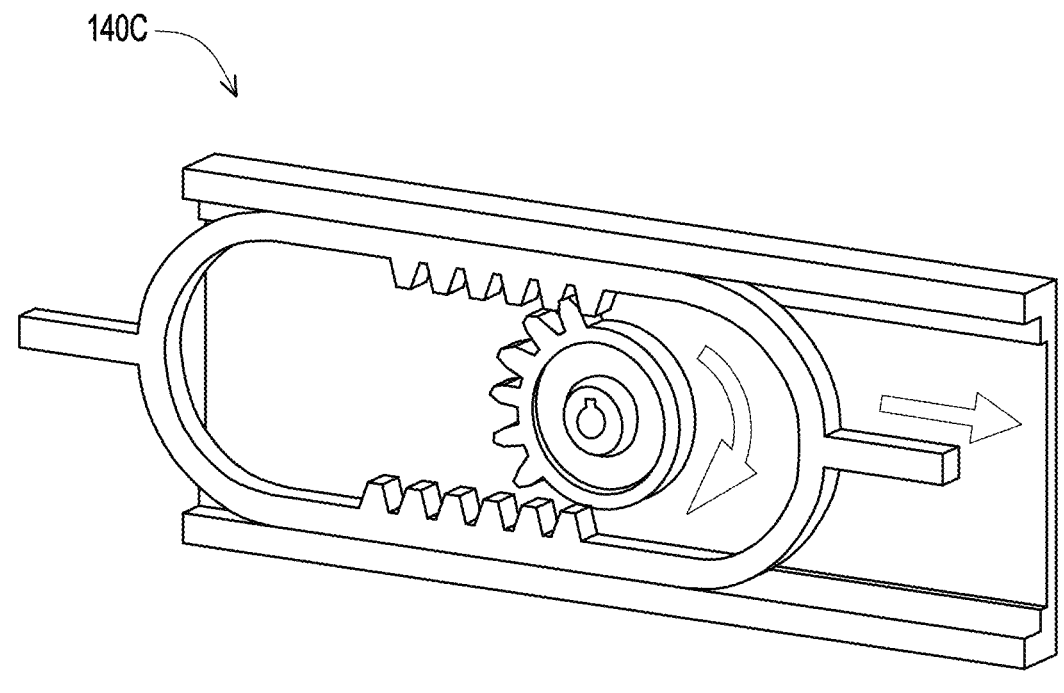
FIG. 10A and FIG. 10B are schematic views of a switching module in different states according to another embodiment of the disclosure.
Figure 10B:
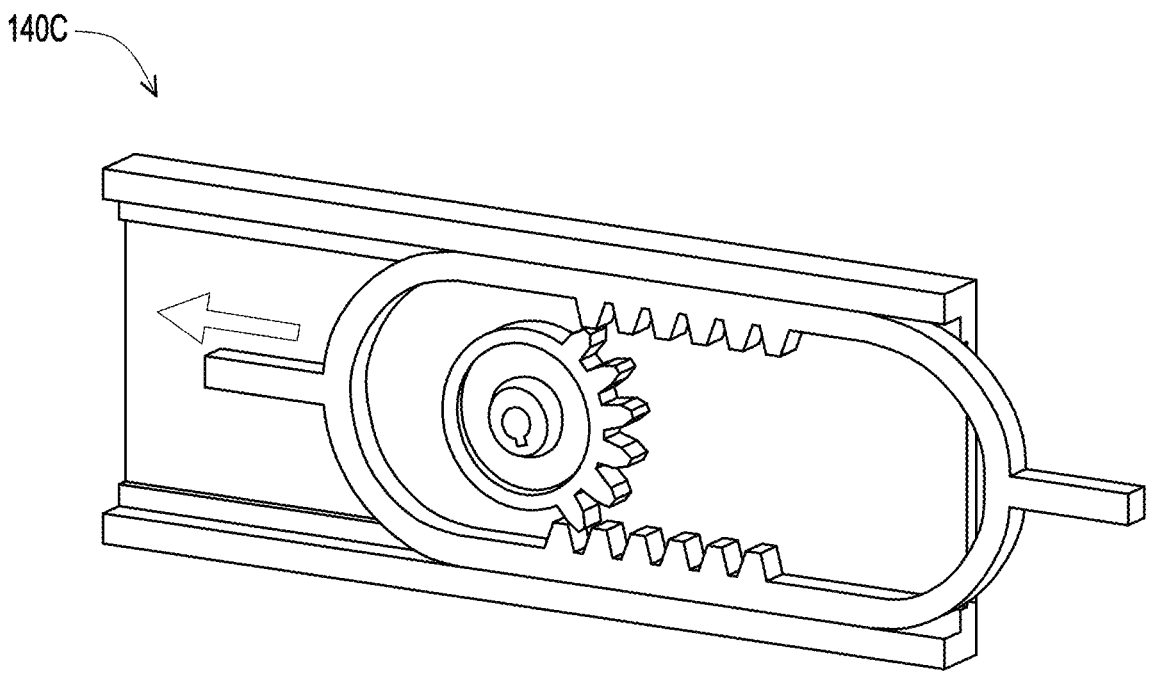

FIG. 10A and FIG. 10B are schematic views of a switching module in different states according to another embodiment. Referring to FIG. 10A and FIG. 10B, in the embodiment, a switching module 140C is, for example, a rack and pinion mechanism, which may be configured to connect the molded part (not shown) to both ends and perform linear reciprocating motion through rotation. The disclosure is not limited thereto.

Figure 11A:
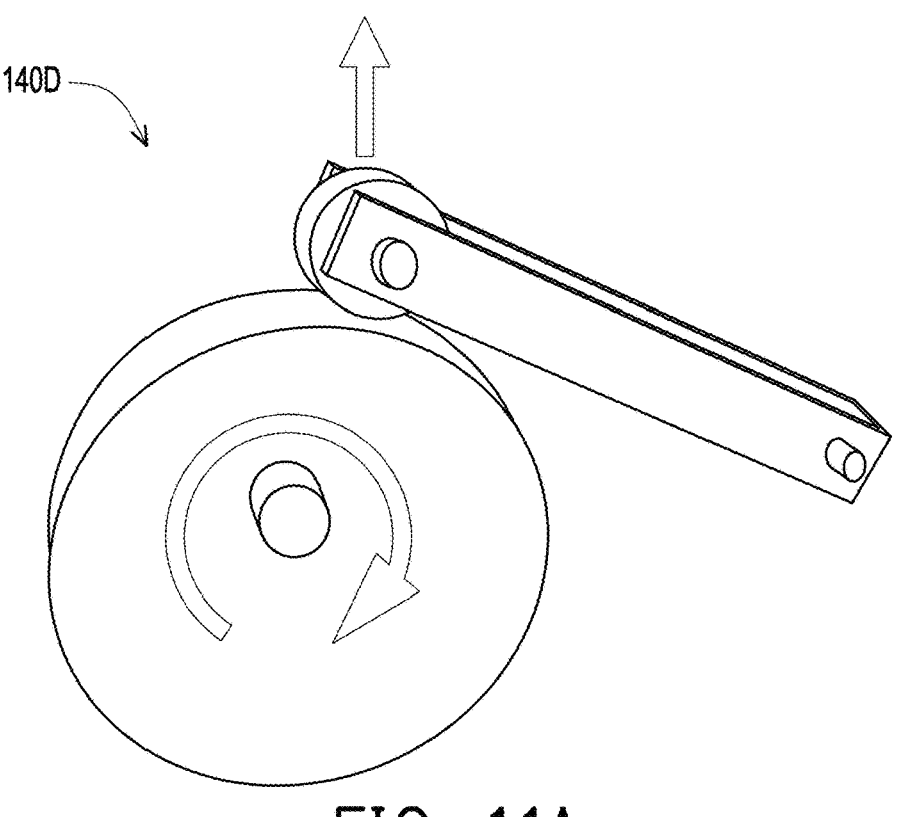
FIG. 11A and FIG. 11B are schematic views of a switching module in different states according to another embodiment of the disclosure.
Figure 11B:
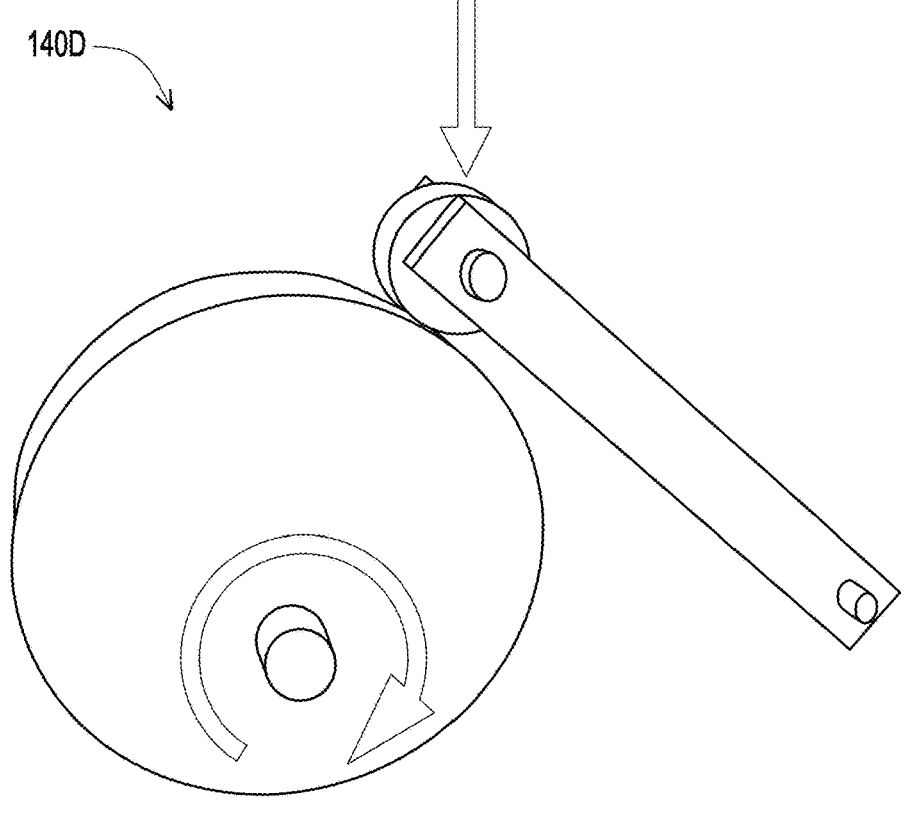

FIG. 11A and FIG. 11B are schematic views of a switching module in different states according to another embodiment. Referring to FIG. 11A and FIG. 11B, in the embodiment, a switching module 140D is, for example, an eccentric mechanism, which may be configured to connect the molded part (not shown) to one of the fulcrums to perform linear reciprocating motion through rotation. The disclosure is not limited thereto. In another embodiment, the switching module (not shown) may be, for example, a screw and nut mechanism that performs linear reciprocating motion through rotation. The disclosure is not limited thereto.

To sum up, in the lighting device of the disclosure, the lighting device includes the housing, the elastic reflective element, the light-emitting unit, and the switching module. The elastic reflective element has the resisting surface and the reflective surface opposite to each other, and the switching module is configured to press against the resisting surface to transform the shape of the reflective surface. When the switching module has not pressed against the resisting surface, or when the switching module has pressed against the resisting surface but has not yet transformed the shape of the reflective surface, the reflective surface assumes the first state, and the illumination beam reflected by the reflective surface has the first light pattern. When the switching module presses against the resisting surface and transforms the shape of the reflective surface, the reflective surface assumes the second state, and the illumination beam reflected by the reflective surface has the second light pattern. In this way, the surface shape of the reflective surface in the elastic reflective element may be adjusted through a simple switching module mechanism, and then the light pattern emitted by the lighting device may be switched to achieve optimized irradiation effects in different situations.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A lighting device, comprising:
   a housing, wherein the housing is a hollow tubular structure;
   an elastic reflective element, configured in the housing, wherein the elastic reflective element has a resisting surface and a reflective surface opposite to each other;
   a light-emitting unit, configured on the elastic reflective element to provide an illumination beam to the reflective surface; and a switching module, configured in the housing, and adapted to press against the resisting surface to transform a shape of the reflective surface;
   wherein when the switching module has not pressed against the resisting surface, or when the switching module has pressed against the resisting surface but has not yet transformed the shape of the reflective surface, the reflective surface assumes a first state, and the illumination beam reflected by the reflective surface has a first light pattern, and when the switching module presses against the resisting surface and transforms the shape of the reflective surface, the reflective surface assumes a second state, and the illumination beam reflected by the reflective surface has a second light pattern.

2. The lighting device according to claim 1, wherein the elastic reflective element comprises a fixed part and a deformation part connected to each other, the light-emitting unit is connected to the fixed part, and the switching module is configured to press against the deformation part.

3. The lighting device according to claim 2, wherein an angle between the fixed part and the deformation part is an acute angle.

4. The lighting device according to claim 1, wherein the switching module is a reciprocating motion mechanism.

5. The lighting device according to claim 1, wherein the switching module comprises a molded part configured to lean against the elastic reflective element, and the molded part is configured to contact the resisting surface.

6. The lighting device according to claim 5, wherein the molded part comprises a body and a guide rod part connected to each other, the switching module also comprises an elastic element sleeved on the guide rod part, the housing comprises a conduit structure, and the guide rod part and the elastic element are disposed within the conduit structure.

7. The lighting device according to claim 5, wherein the switching module also comprises a cam structure and a relay element, the relay element is fixed to the molded part, and the cam structure leans against the relay element for rotating along a rotation axis to push the relay element, when the cam structure rotates to a first position, the relay element drives the molded part so that there is a gap between the molded part and the elastic reflective element, and when the cam structure rotates to a second position, the relay element drives the molded part so that the molded part presses against the elastic reflective element.

8. The lighting device according to claim 7, wherein the relay element is an annular structure, the cam structure comprises a cam part and a rotating part, and the cam part leans against an inner-side surface of the relay element.

9. The lighting device according to claim 8, wherein an outer diameter dimension of the rotating part is the same as an outer diameter dimension of the housing.

10. The lighting device according to claim 1, wherein the switching module comprises at least one of a crank link mechanism, a slider crank mechanism, a cam mechanism, a screw and nut mechanism, a rack and pinion mechanism, or an eccentric mechanism.

* * * * *